(12) United States Patent
Azuma et al.

(10) Patent No.: US 11,525,540 B2
(45) Date of Patent: Dec. 13, 2022

(54) SUPPORTING STRUCTURE AND DISPLAY APPARATUS

(71) Applicant: Sony Group Corporation, Tokyo (JP)

(72) Inventors: Yohei Azuma, Tokyo (JP); Takeshi Yamamoto, Tokyo (JP)

(73) Assignee: Sony Group Corporation

( * ) Notice: Subject to any disclaimer, the term of this patent is extended or adjusted under 35 U.S.C. 154(b) by 28 days.

(21) Appl. No.: 17/281,454

(22) PCT Filed: Sep. 11, 2019

(86) PCT No.: PCT/JP2019/035743
§ 371 (c)(1),
(2) Date: Mar. 30, 2021

(87) PCT Pub. No.: WO2020/075437
PCT Pub. Date: Apr. 16, 2020

(65) Prior Publication Data
US 2022/0003356 A1    Jan. 6, 2022

(30) Foreign Application Priority Data

Oct. 12, 2018 (JP) .............................. JP2018-193567

(51) Int. Cl.
*F16M 11/10* (2006.01)
*G02F 1/1333* (2006.01)
*F16M 13/02* (2006.01)

(52) U.S. Cl.
CPC ............ *F16M 11/10* (2013.01); *F16M 13/02* (2013.01); *G02F 1/13336* (2013.01); *G02F 1/133308* (2013.01); *G02F 1/133322* (2021.01)

(58) Field of Classification Search
CPC .. F16M 13/02; F16M 11/10; G02F 1/133322; G02F 1/133308; G02F 1/13336
See application file for complete search history.

(56) References Cited

U.S. PATENT DOCUMENTS

2009/0278006 A1* 11/2009 Park ...................... F16M 11/10
                                                                  248/302
2011/0163052 A1    7/2011 Kim et al.
(Continued)

FOREIGN PATENT DOCUMENTS

CN        205824556 U        12/2016
CN        106402610 B    *   2/2018   ........... F16M 11/041
(Continued)

OTHER PUBLICATIONS

International Search Report for PCT/JP2019/035743 dated Dec. 10, 2019; 3 pages.

*Primary Examiner* — Mariceli Santiago
(74) *Attorney, Agent, or Firm* — Lerner, David, Littenberg, Krumholz & Mentlik, LLP

(57) ABSTRACT

Provided is a display apparatus having a structure excellent in workability upon installation. The display apparatus includes: a display section; and a supporting structure that is to be mounted on a wall surface and supports the display section. The supporting structure includes a support that supports the display section from below in a vertical direction, and an inclination adjusting mechanism provided at the support and configured to adjust an inclination of the display section with respect to the vertical direction.

11 Claims, 12 Drawing Sheets

(56) References Cited

U.S. PATENT DOCUMENTS

2016/0165745 A1 6/2016 Choi et al.
2017/0127057 A1 5/2017 Sung et al.

FOREIGN PATENT DOCUMENTS

| | | | | |
|---|---|---|---|---|
| CN | 109084154 A | * | 12/2018 | ............. F16M 11/06 |
| DE | 202005019196 U1 | | 4/2006 | |
| DE | 202016102611 U1 | | 6/2016 | |
| JP | 2004336603 A | | 11/2004 | |
| JP | 2006313220 A | | 11/2006 | |
| JP | 2011070181 A | | 4/2011 | |
| JP | 2015200710 A | | 11/2015 | |
| JP | 2016142861 A | | 8/2016 | |
| KR | 20040021741 A | * | 3/2004 | |
| KR | 20160107142 A | | 9/2016 | |
| WO | 2005098358 A2 | | 10/2005 | |
| WO | 2009157161 A1 | | 12/2009 | |
| WO | 2010114247 A1 | | 10/2010 | |

* cited by examiner

[FIG. 1]
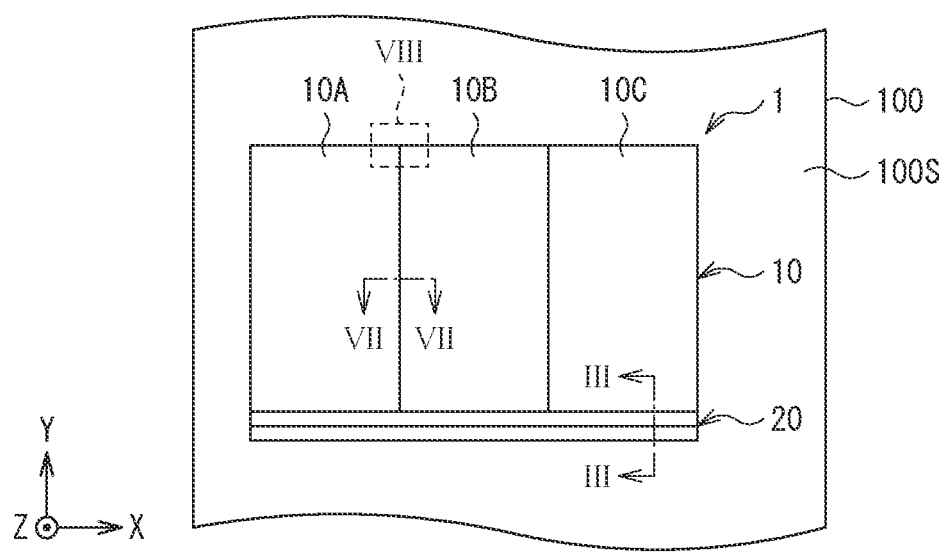

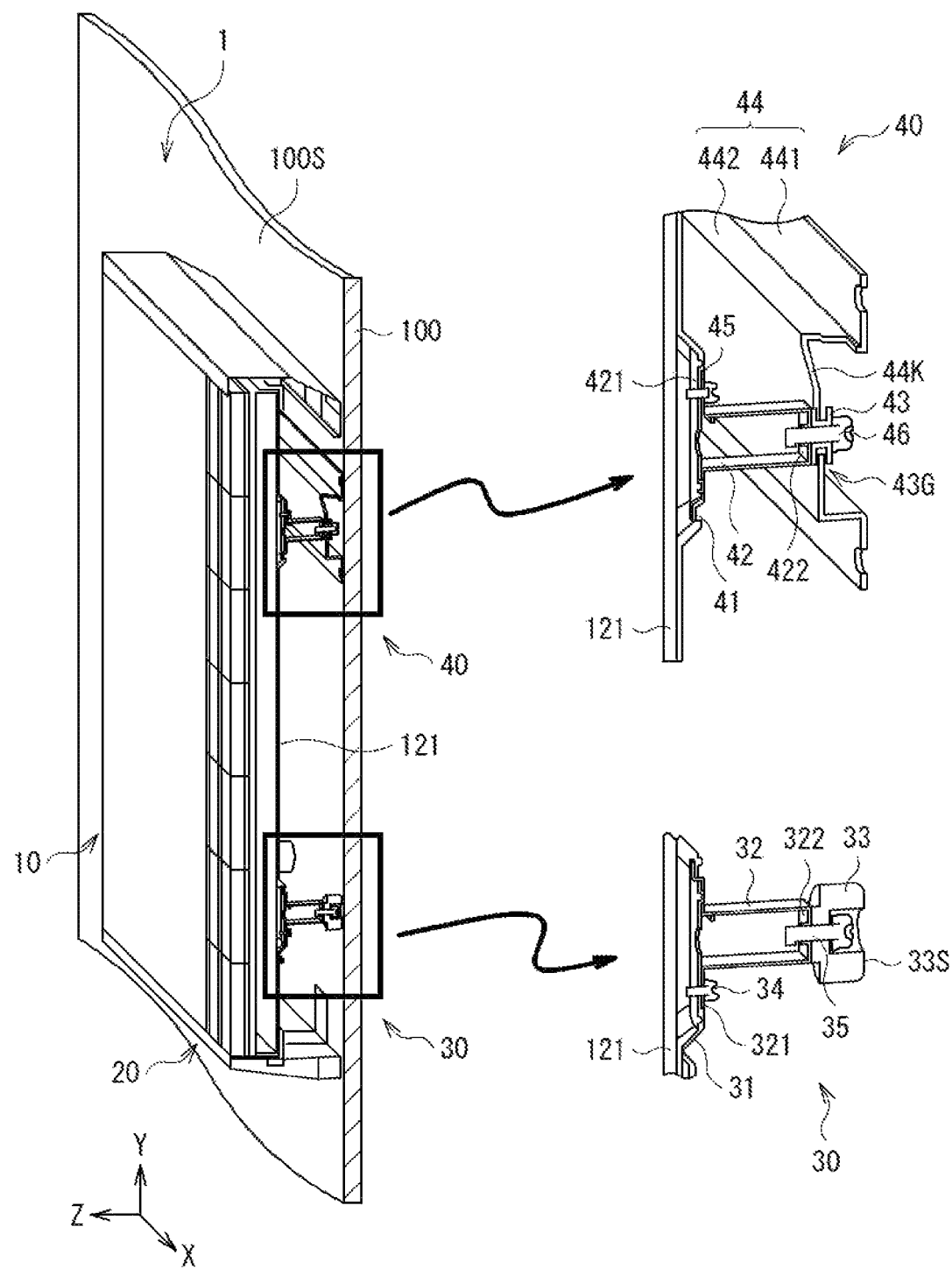
[FIG. 2]

[FIG. 3]
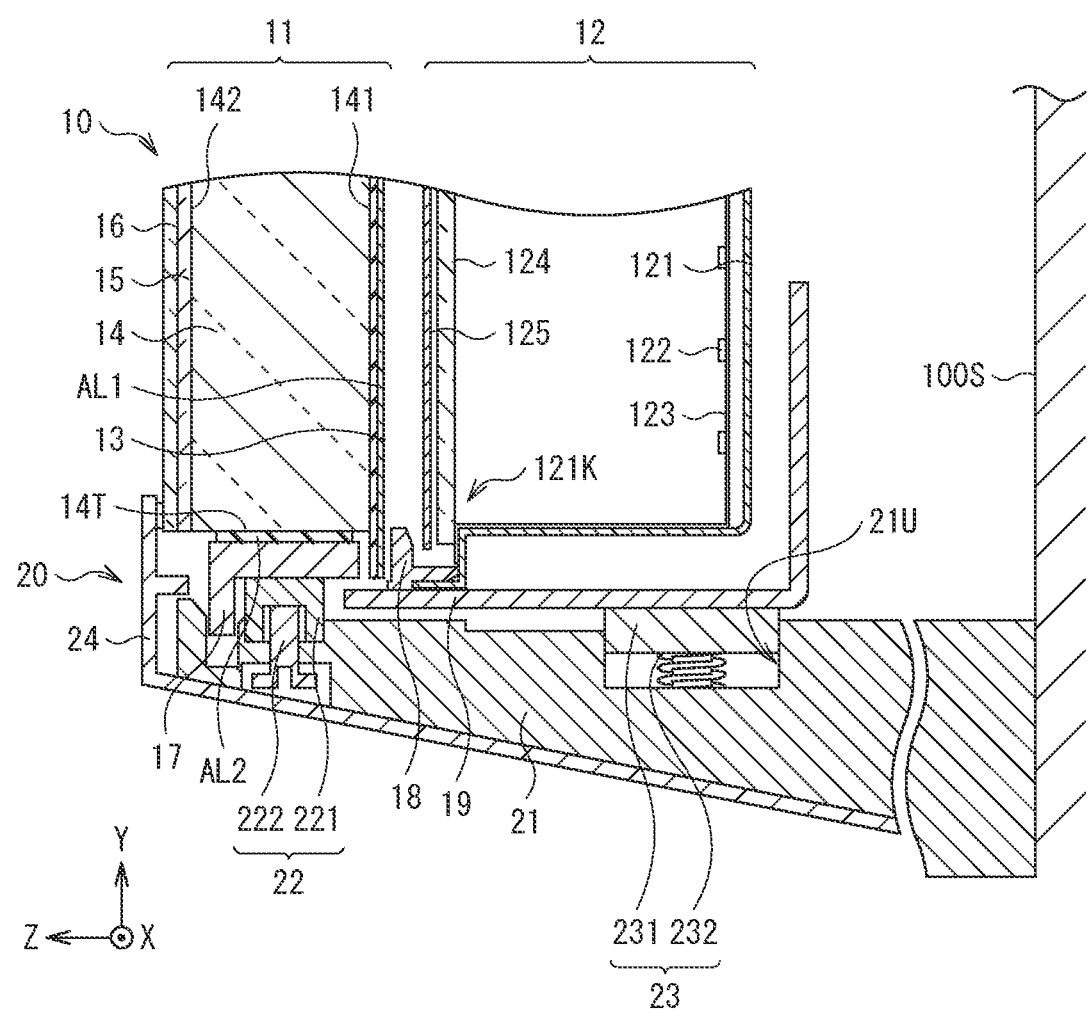

[ FIG. 4 ]
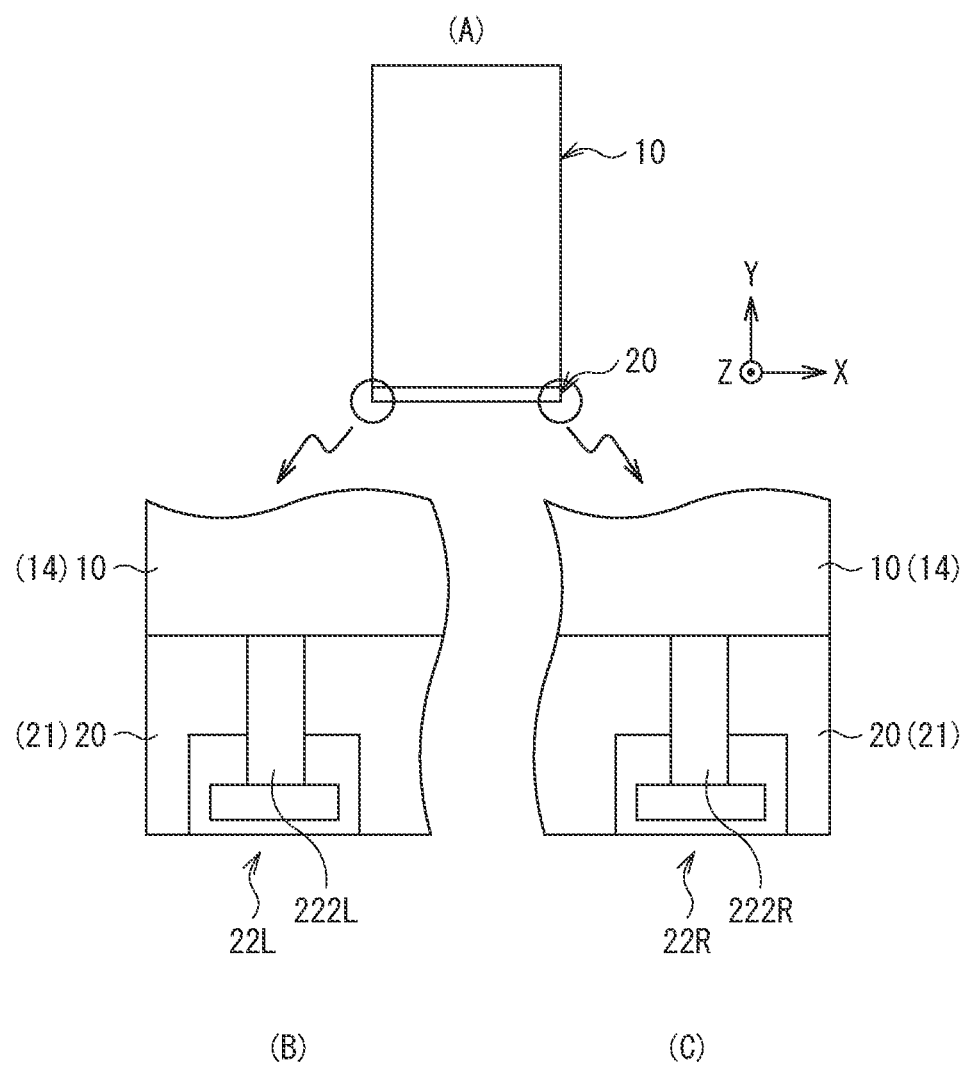

[ FIG. 5A ]
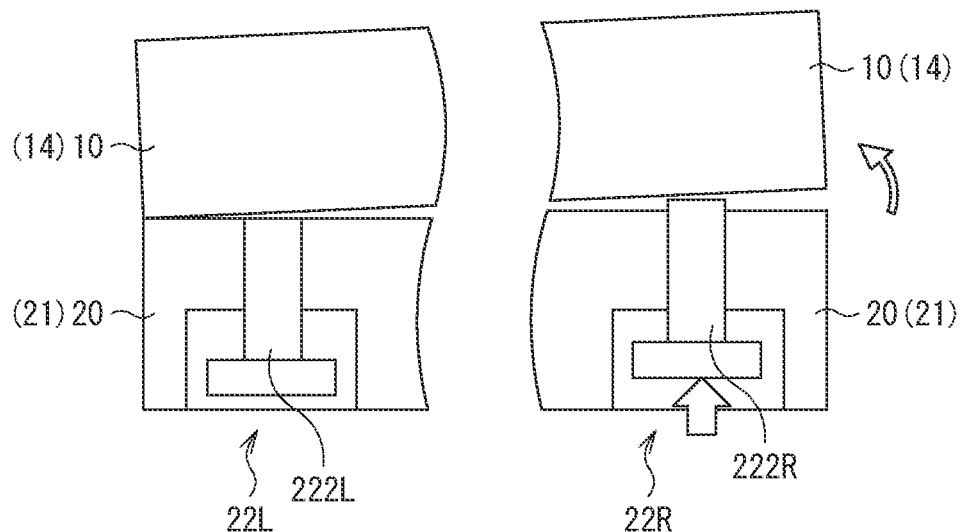
[ FIG. 5B ]
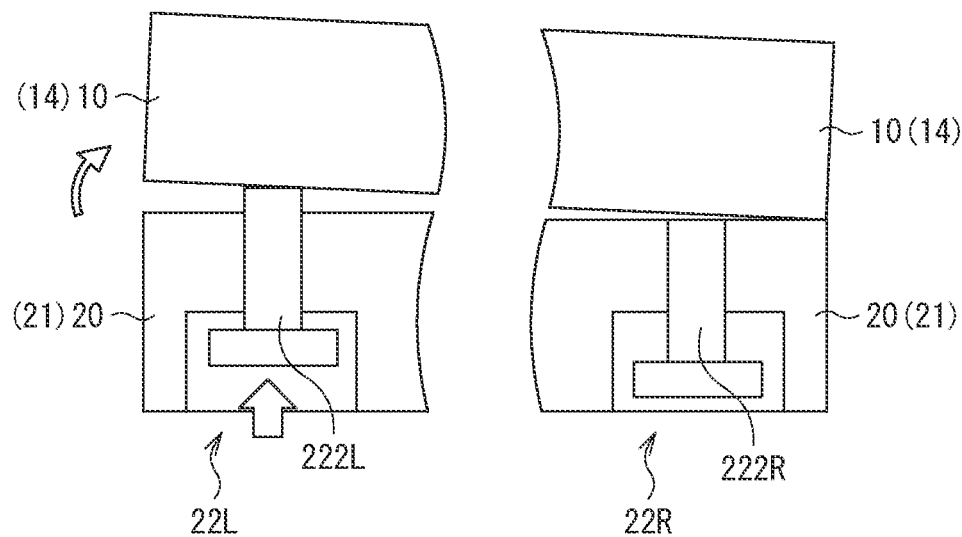

[FIG. 6]
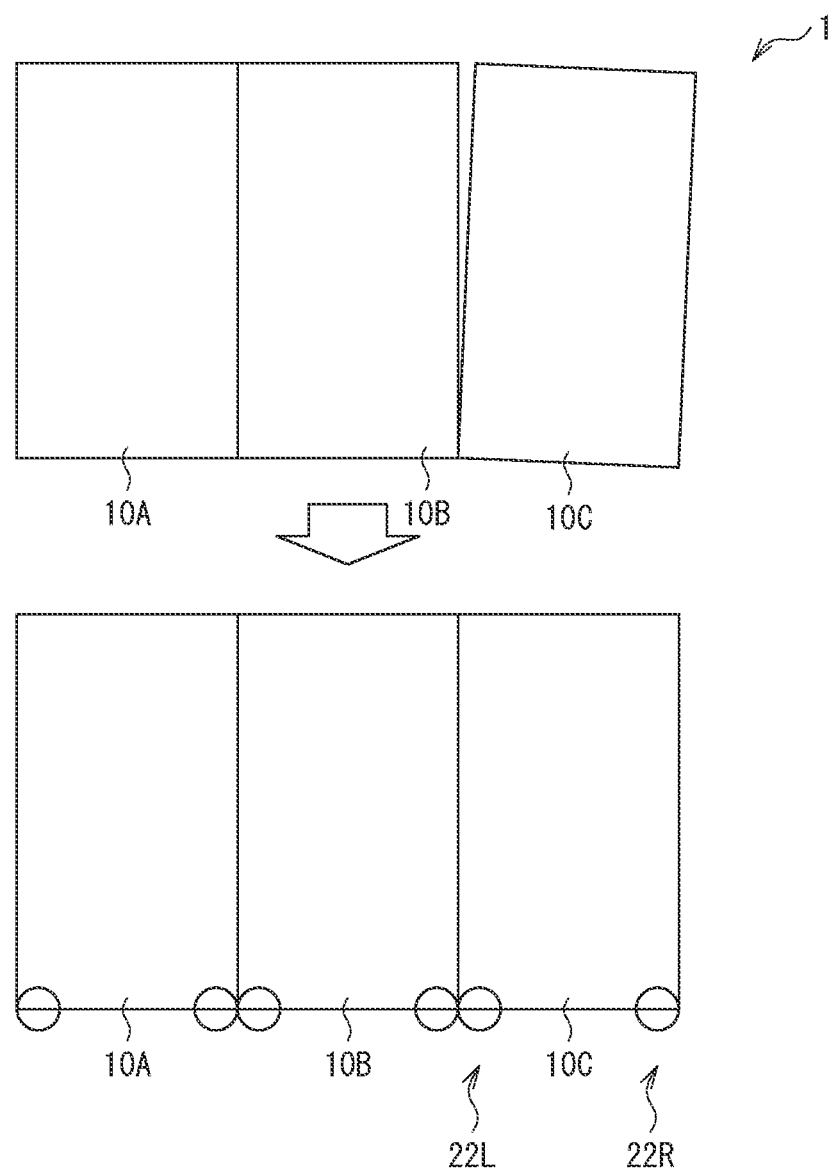

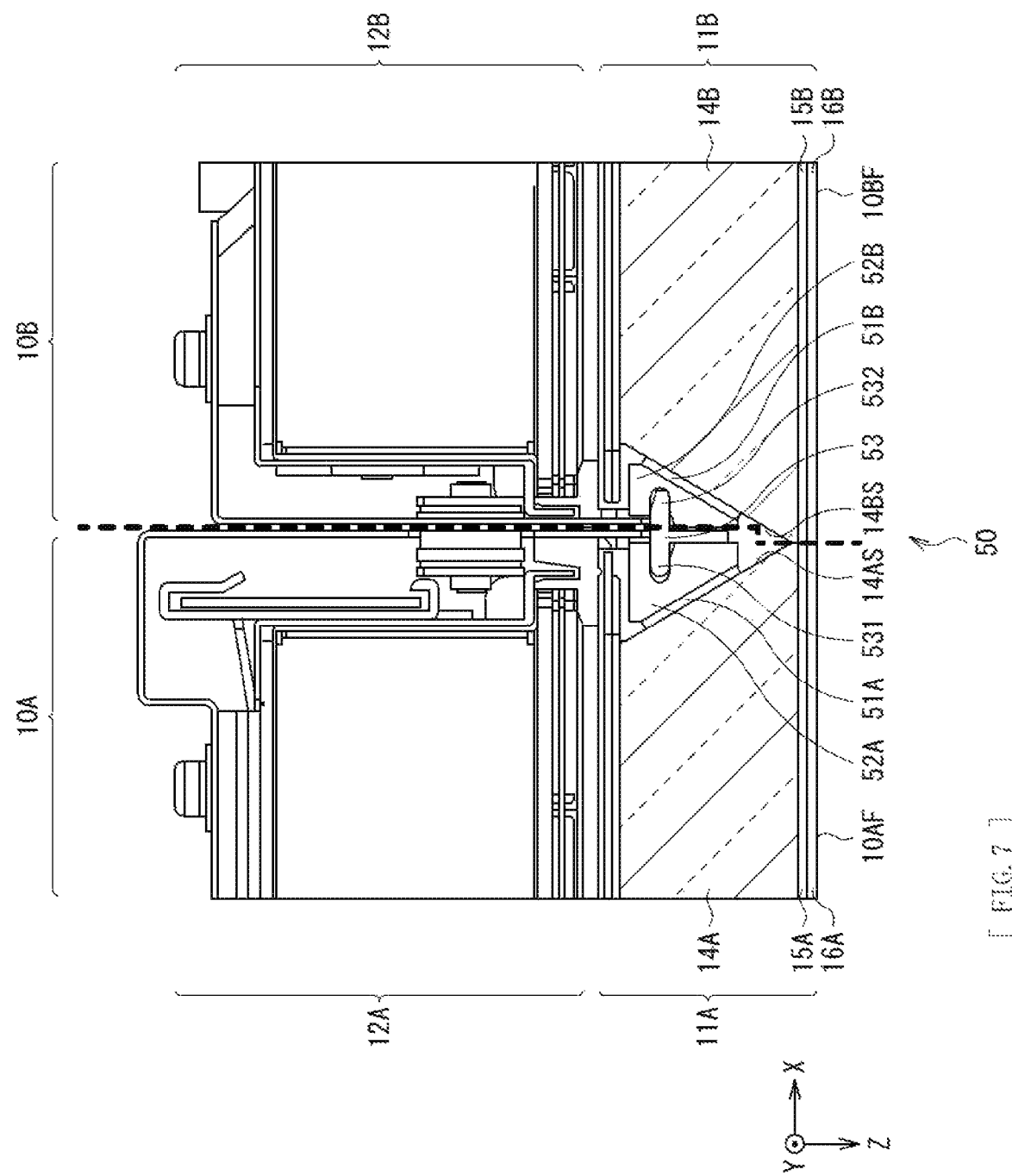
[ FIG. 7 ]

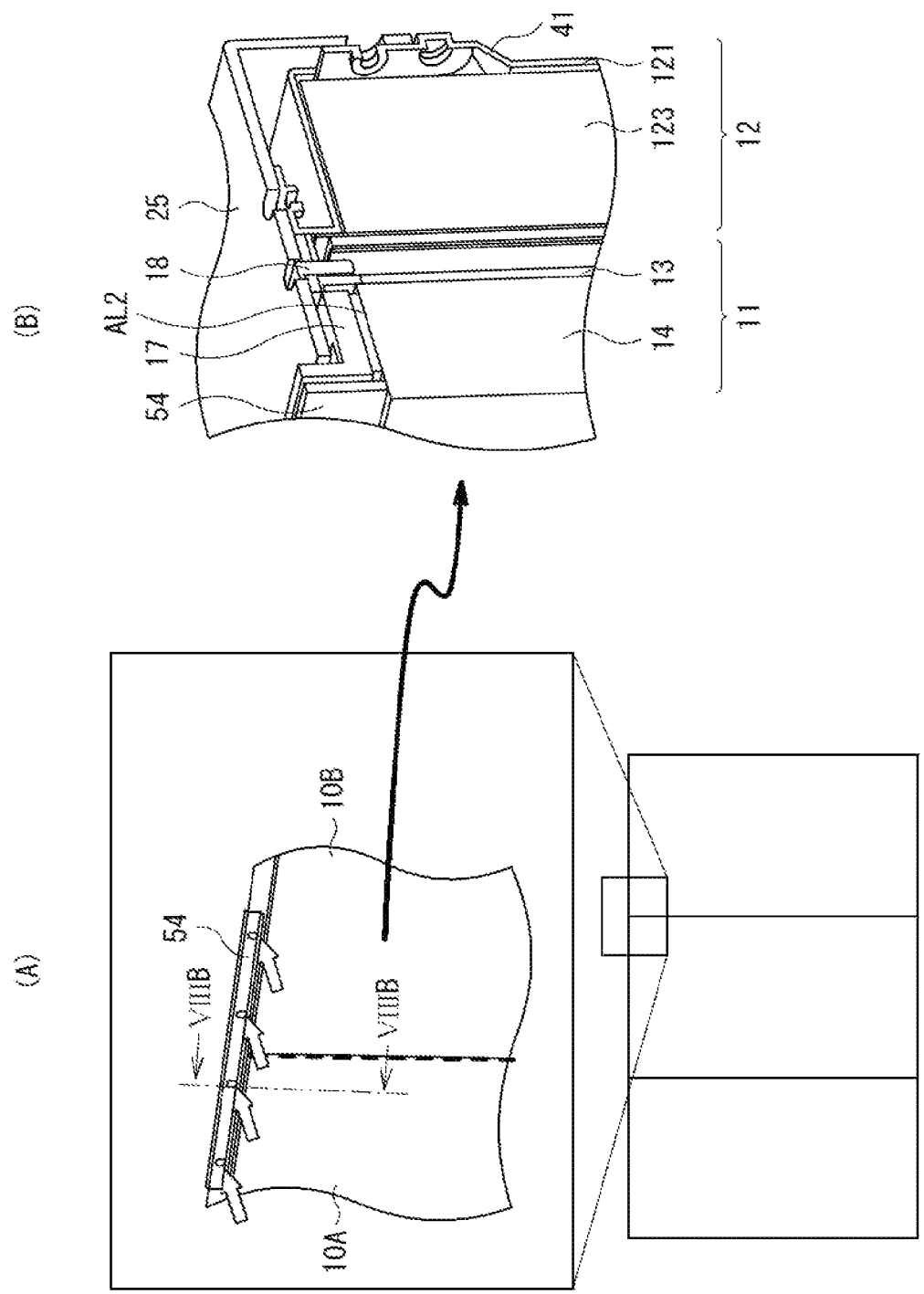
[FIG. 8]

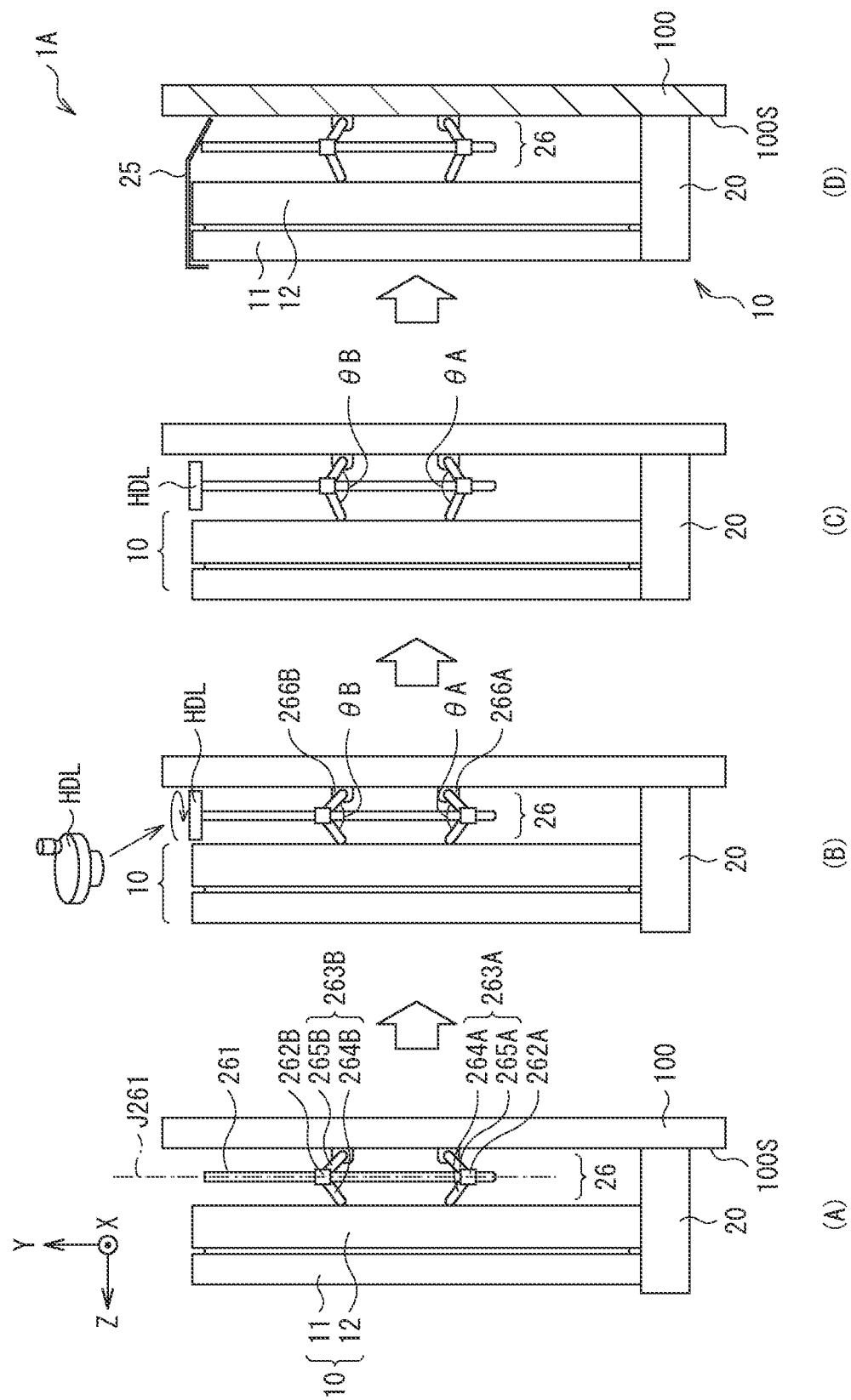
[FIG. 9]

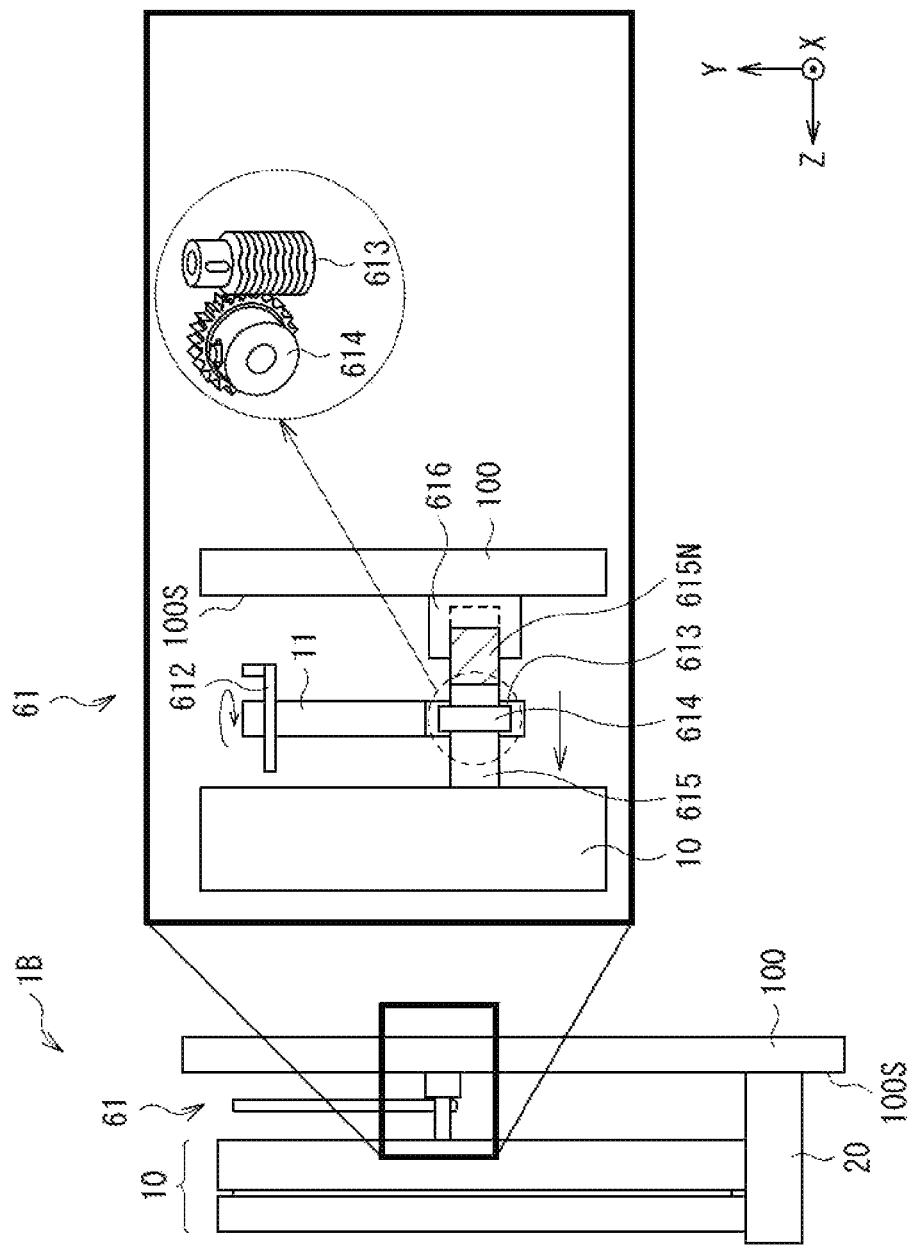
[ FIG. 10 ]

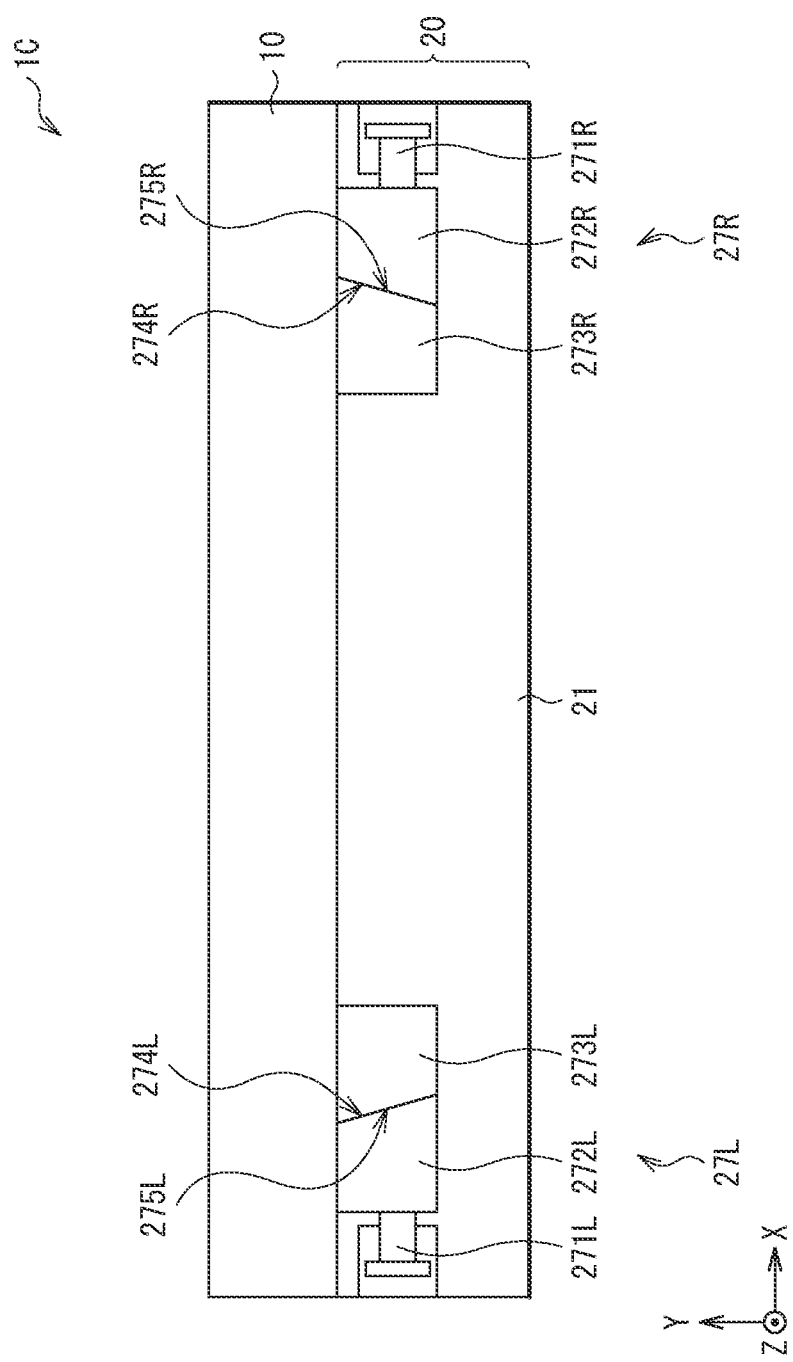
[ FIG. 11A ]

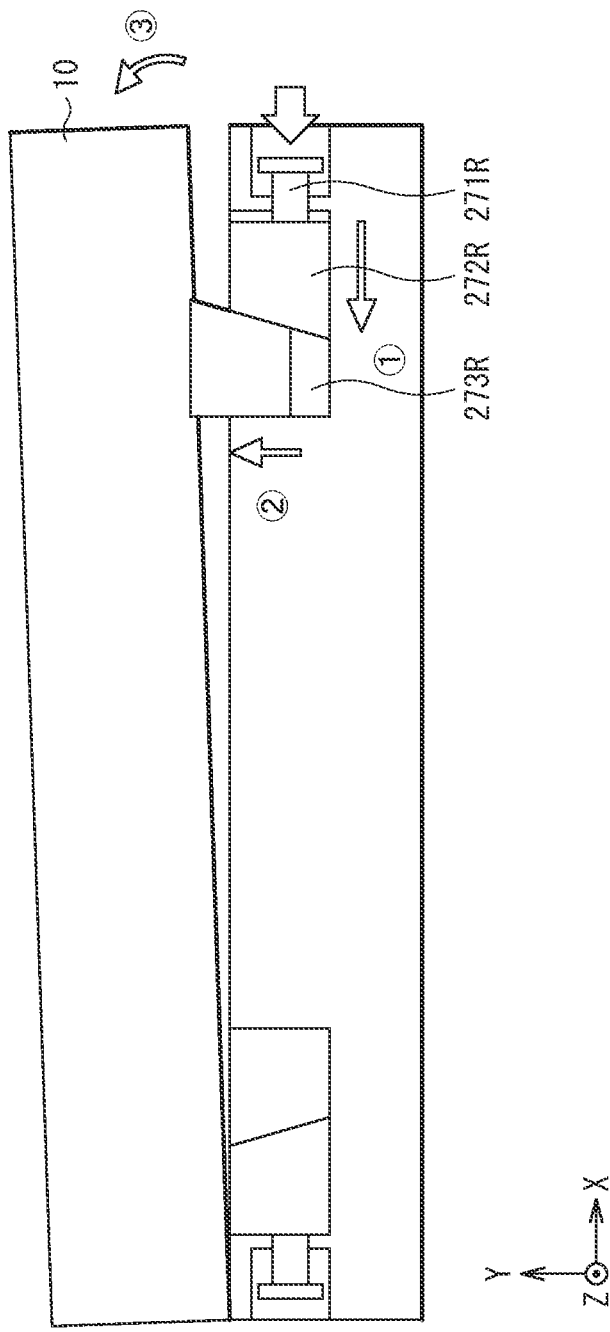
[ FIG. 11B ]

SUPPORTING STRUCTURE AND DISPLAY APPARATUS

CROSS-REFERENCE TO RELATED APPLICATIONS

This application is a national phase entry under 35 U.S.C. § 371 of International Application No. PCT/JP2019/035743 filed Sep. 11, 2019, which claims the priority from Japanese Patent Application No. 2018-193567 filed in the Japanese Patent Office on Oct. 12, 2018, the entire contents of which are hereby incorporated by reference.

TECHNICAL FIELD

The present disclosure relates to a supporting structure that attaches, to a wall, a display panel such as a television receiver or a monitor, and to a display apparatus that includes the supporting structure and the display panel.

BACKGROUND ART

The present Applicant has proposed so far a supporting member that attaches a display panel to a wall surface, and a display apparatus that includes the supporting member (see, for example, Patent Literature 1).

CITATION LIST

Patent Literature

Patent Literature 1: International Publication No. 2005/098358

SUMMARY OF THE INVENTION

Recently, a size of a screen of a display apparatus is increasing remarkably. However, it is not easy to maintain, at a high level, an accuracy of a mounting position and an accuracy of an attitude upon mounting such a large-screen display apparatus on a wall surface.

Therefore, it is desirable to provide a display apparatus having a structure excellent in workability upon installation and a supporting structure to be applied to the display apparatus.

A supporting structure according to one embodiment of the present disclosure is to be mounted on a wall surface and configured to support a display section. The supporting structure includes: a support configured to support the display section from below in a vertical direction; and an inclination adjusting mechanism provided at the support and configured to adjust an inclination of the display section with respect to the vertical direction.

A display apparatus according to one embodiment of the present disclosure includes: a display section; and a supporting structure that is to be mounted on a wall surface and supports the display section. The supporting structure includes a support that supports the display section from below in a vertical direction, and an inclination adjusting mechanism provided at the support and configured to adjust an inclination of the display section with respect to the vertical direction.

In the supporting structure and the display apparatus according to one embodiment of the present disclosure, the inclination of the display section with respect to the vertical direction is adjustable by the inclination adjusting mechanism in a state in which a load of the display section is applied to the support.

BRIEF DESCRIPTION OF THE DRAWINGS

FIG. 1 is a schematic front diagram illustrating an example of an overall configuration of a display apparatus according to an embodiment of the present disclosure.

FIG. 2 is a partially cut-away perspective diagram schematically illustrating an example of the overall configuration of the display apparatus illustrated in FIG. 1.

FIG. 3 is a cross-sectional diagram illustrating an example of an inner configuration of a main part of the display apparatus illustrated in FIG. 1.

FIG. 4 includes a front diagram illustrating a portion corresponding to one of display panels of the display apparatus illustrated in FIG. 1, and a front diagram schematically illustrating the vicinity of an inclination adjusting mechanism illustrated in FIG. 3 in an enlarged manner.

FIG. 5A is an explanatory diagram for explaining an operation of the inclination adjusting mechanism when inclining the display panel illustrated in FIG. 4 to the left.

FIG. 5B is an explanatory diagram for explaining an operation of the inclination adjusting mechanism when inclining the display panel illustrated in FIG. 4 to the right.

FIG. 6 is an explanatory diagram for explaining an operation of correcting a deviation in inclination between the multiple display panels in the display apparatus illustrated in FIG. 1.

FIG. 7 is an enlarged cross-sectional diagram illustrating the vicinity of a boundary between display sections that are adjacent to each other.

FIG. 8 includes an enlarged perspective diagram and a cross-sectional diagram illustrating the vicinity of the boundary between the display sections that are adjacent to each other.

FIG. 9 is a schematic diagram for explaining a configuration and an operation of a display apparatus according to a first modification example of the present disclosure.

FIG. 10 is a schematic diagram for explaining a configuration and an operation of a display apparatus according to a second modification example of the present disclosure.

FIG. 11A is a schematic diagram illustrating a configuration of a display apparatus according to a third modification example of the present disclosure.

FIG. 11B is a schematic diagram illustrating an operation of the display apparatus according to the third modification example illustrated in FIG. 11A.

MODES FOR CARRYING OUT THE INVENTION

Hereinafter, some embodiments of the present disclosure are described in detail with reference to the drawings. The description will be made in the following order.

1. One Embodiment and Modification Examples Thereof

An example of a display apparatus in which multiple panels are mounted on a wall surface by a common supporting structure.

2. Other Modification Examples

1. One Embodiment

[Configuration of Display Apparatus 1]

FIG. 1 is a front diagram schematically illustrating an overall configuration of a display apparatus 1 according to an embodiment of the present disclosure. In addition, FIG. 2 is a partially cut-away perspective diagram schematically illustrating an example of the overall configuration of the display apparatus 1. Further, FIG. 3 is a cross-sectional diagram illustrating an example of an inner configuration of a main part of the display apparatus 1 illustrated in FIG. 1, and illustrates a cross-section taken along the III-III cutting line illustrated in FIG. 1 and as viewed in an arrow direction.

The display apparatus 1 is used, for example, as a low-profile television device, and is to be mounted, for example, on a wall surface 100S. For example, the display apparatus 1 includes: a display section 10; and a supporting structure 20 that is to be attached to the wall surface 100S and supports the display section 10.

(Display Section 10)

The display apparatus 1 includes a plurality of display sections 10. FIG. 1 illustrates an example in which, for example, display sections 10A to 10C having substantially the same structure are arranged in a horizontal direction (in an X-axis direction). As illustrated in FIG. 3, the display section 10 has a display unit 11 and a backlight unit 12 disposed at the rear of the display unit 11. Note that, in this specification, the horizontal direction along a screen of the display section 10 is the X-axis direction, a vertical direction along the screen of the display section 10 is a Y-axis direction, and a front-rear direction orthogonal to the screen of the display section 10 is an Z-axis direction. Further, in the front-rear direction, a surface facing a viewer is referred to as a front surface, and a surface facing the wall surface 100S is referred to as a rear surface. Further, a direction facing the viewer may sometimes be referred to as front, and a direction facing opposite to the viewer may sometimes be referred to as rear.

((Display Unit 11))

The display unit 11 has a display panel 13, a light guide member 14, an optical sheet 15, and a protective sheet 16 that are arranged in order from the rear surface side toward the front surface side.

The display panel 13 includes a display surface that displays an image, such as a moving image or a still image, toward the front. The display panel 13 is, for example, a transmission-type liquid crystal display panel, and has a liquid crystal layer provided between a TFT substrate and a color filter substrate, for example. Accordingly, light, emitted from a light source 122 (described later) of the backlight unit 12 and arrived through the optical sheet 124 and the optical sheet 125, passes through the display panel 13, whereby an image is displayed. The display panel 13 may further include a polarizing plate or the like.

For example, the multiple light guide members 14 are provided for one display panel 13. The multiple light guide members 14 are arranged in matrix along the X-axis direction and the Y-axis direction, for example. That is, the multiple light guide members 14 are allocated to multiple regions divided in the X-Y plane (the display surface) one by one for one display panel 13. Each light guide member 14 has multiple optical fibers that are bundled and thus integrated. The optical fiber includes a quartz glass or a transparent resin as a main constituent material. Each light guide member 14 allows image light, having entered an input surface 141 that faces the display panel 13, to be outputted from an output surface 142 positioned on the opposite side of the display panel 13. Note that a single light guide member in which the multiple light guide members 14 are integrated and formed in a plate shape may be provided for one display panel 13.

The optical sheet 15 is, for example, a diffusing sheet or an antireflection sheet. In addition, the protective sheet 16 is a transparent member that protects the optical sheet 15, the light guide member 14, the display panel 13, or the like from a mechanical damage, and includes a transparent plastic, a glass, or the like.

A transparent adhesion layer AL1 is provided between the display panel 13 and the light guide member 14. The display panel 13 and the light guide member 14 are bonded and fixed by the adhesion layer ALL The adhesion layer AL1 is also a buffer member that absorbs an external force applied between the display panel 13 and the light guide member 14. Note that the display panel 13 and the light guide member 14 may be fixed by a method other than adhesion.

Further, an end surface 14T of the light guide member 14 is fixed to a bracket 17 via an adhesion layer AL2. The bracket 17 is provided along an upper edge and a lower edge in the X-Y plane of the light guide member 14. A constituent material of the bracket 17 may be a high-rigidity metal material such as stainless steel, for example. In addition, as with the adhesion layer AL1, the adhesion layer AL2 is also a buffer member that absorbs an external force applied between the end surface 14T of the light guide member 14 and the bracket 17. Note that the adhesion layer AL2 may not be transparent.

((Backlight Unit 12))

The backlight unit 12 is a mechanism that provides illumination light to the display panel 13 from the rear surface thereof. The backlight unit 12 is a so-called direct backlight unit. The backlight unit 12 has, for example, a housing 121, a reflection sheet 123 in which multiple light sources 122 are arranged, and an optical sheet 124 and an optical sheet 125 arranged in front of the multiple light sources 122 and the reflection sheet 123.

The housing 121 is a box-shaped member having an opening 121K at a front part thereof. The opening 121K has a size corresponding to that of the display panel 13. A bracket 18 is fixed to the housing 121 along the opening 121K. Note that a constituent material of the bracket 18 may be, for example, a plastic, or may be a high-rigidity metal material such as stainless steel as with the configuration of the bracket 17. The bracket 17 is fixed to a frame 19 provided below thereof. For example, the bracket 17 is fixed to the frame 19 by fastening that uses a screw or by welding or the like. In a cross-sectional diagram illustrated in FIG. 3, although the bracket 17 is depicted as being separated from the frame 19, the bracket 17 is fixed to the frame 19 at a position different from the cross-section illustrated in FIG. 3 in the X-axis direction. The housing 121 is also fixed to the frame 19, for example, by fastening that uses a screw or by welding or the like. Accordingly, the display unit 11 and the backlight unit 12 are integrated via the bracket 17, the bracket 18, and the frame 19.

The multiple light sources 122, for example, are arranged in a matrix on a surface of the reflection sheet 123. For example, the multiple light sources 122 are configured by LEDs (Light Emitting Diode; light-emitting diode) that oscillate white light. The reflection sheet 123 is a member that exerts an optical effect such as reflection, diffusion, scattering, or the like on the light emitted from the light sources 122. The optical sheet 124 and the optical sheet 125 are provided so as to entirely cover the reflection sheet 123. The optical sheet 124 and the optical sheet 125 are each a stack of a plurality of sheet-shaped members including, for example, a diffusion plate, a diffusion sheet, a lens film, a polarization separating sheet, and the like. By providing the optical sheet 124 and the optical sheet 125, it is possible to rise, in the front direction (Z-axis direction), the light outputted in an oblique direction from the light sources 122 and the light outputted in an oblique direction from the reflection sheet 123, making it possible to further increase the front luminance.

(Supporting Structure 20)

The supporting structure 20 includes a body 21, an inclination adjusting mechanism 22, a supporting mechanism 23, and a bezel 24.

((Body 21))

The body 21 is a structure that is arranged below in the vertical direction of the display section 10, and supports the display section 10 from the below in the vertical direction (the Y-axis direction). Most of the loads of the display section 10 are applied to the body 21. Accordingly, it is desirable that the body 21 include a highly rigid metal material such as stainless steel, for example. As illustrated in FIG. 3, the body 21 may have a larger size in the vertical direction (the Y-axis direction) at a base end portion that is close to the wall surface 100S in the Z-axis direction than at a distal end portion that is farther from the wall surface 100S in the Z-axis direction. In particular, the body 21 may include a portion having a shape in which a size in the vertical direction (the Y-axis direction) increases as going closer to the wall surface 100S in the Z-axis direction. Further, the body 21 may be provided one by one corresponding to each of the multiple display sections 10 structuring the display apparatus 1, or may be provided commonly to the multiple display sections 10. FIG. 1 exemplifies one body 21 commonly and integrally provided for all the display sections 10A to 10C. That is, in the display apparatus 1 of FIG. 1, the body 21 has a length corresponding to the total length of the display sections 10A to 10C in the X-axis direction.

((Inclination Adjusting Mechanism 22))

The inclination adjusting mechanism 22 is provided at the body 21, and adjusts an inclination of the display section 10 with respect to the vertical direction. The inclination adjusting mechanism 22 includes a contacting member 221 that is in contact with a lower surface of the bracket 17 fixed to the display unit 11 via the adhesion layer AL2, and a screw member 222 serving as a lifting member that pushes up the contacting member 221 from below. Accordingly, the screw member 222 pushes up the light guide member 14 of the display section 10 from the below via the contacting member 221, the bracket 17, and the like. The screw member 222 includes a screw thread that threadedly engages with a thread groove provided at the body 21. The screw member 222 moves up and down with respect to the body 21 as the screw member 222 is rotated.

For example, as illustrated in (A) of FIG. 4, the inclination adjusting mechanism 22 may be provided in the vicinity of both ends (each portion surrounded by a circle) of a lower part of the display section 10 in the horizontal direction (the X-axis direction). For convenience of explanation, FIG. 4 schematically illustrates a part corresponding to one of the display sections 10 of the display apparatus 1 as viewed from the front, in which the inclination adjusting mechanism 22 on the left side is referred to as an inclination adjusting mechanism 22L, and the inclination adjusting mechanism 22 on the right side is referred to as an inclination adjusting mechanism 22R. (B) of FIG. 4 illustrates the vicinity of the inclination adjusting mechanism 22L in an enlarged manner, and (C) of FIG. 4 illustrates the vicinity of the inclination adjusting mechanism 22R in an enlarged manner. FIG. 4 illustrates a state in which both the inclination adjusting mechanism 22L and the inclination adjusting mechanism 22R are at their origin positions, and a lower surface of the display section 10 and an upper surface of the supporting structure 20 are substantially parallel.

((Supporting Mechanism 23))

The supporting mechanism 23 is placed in a recess 21U. Out of an upper part of the body 21, the recess 21U is provided at a position corresponding to the backlight unit 12, for example. The supporting mechanism 23 includes a contacting member 231 and a biasing member 232. The supporting mechanism 23 receives, together with the inclination adjusting mechanism 22 in a sharing fashion, the load of the display section 10. The supporting mechanism 23 elastically supports the display section 10. A plurality of the supporting mechanisms 23 may be provided. The contacting member 231 is a support block that is in contact with a lower surface of the frame 19 of the display section 10. The contacting member 231 is biased, for example, in the vertical direction by the biasing member 232. The contacting member 231 is provided in the recess 21U and is movable up and down along a side wall of the recess 21U. The biasing member 232 is, for example, a coiled spring, and is interposed between the contacting member 231 and the body 21. The biasing member 232 exerts a biasing force sufficient to prevent the contacting member 231 and the body 21 from contacting each other. Note that a predetermined amount of clearance (gap) is provided between the side wall of the recess 21U and the contacting member 231, allowing the contacting member 231 to be inclined as well in accordance with the inclination of the frame 19.

The display apparatus 1 may further include a lower attitude retaining mechanism 30 and an upper attitude retaining mechanism 40 to retain an attitude of the display section 10. The lower attitude retaining mechanism 30 and the upper attitude retaining mechanism 40 appropriately maintain a distance between the display section 10 and the wall surface 100S and an inclination angle (i.e., an elevation angle) of the display section 10 in the front-rear direction (the Z-axis direction) with respect to the vertical direction (the Y-axis direction).

Specifically, the lower attitude retaining mechanism 30 has an attachment section 31 provided on a rear surface of the housing 121 of the backlight unit 12, a spacer 32 provided to stand on the rear surface of the housing 121 at the attachment section 31, and a contacting section 33 provided on the opposite side of the attachment section 31 with the spacer 32 interposed therebetween. A first end section 321 of the spacer 32 is fastened to the attachment section 31 by a screw 34, for example. A second end section 322 of the spacer 32 is fastened to the contacting section 33 by a screw 35, for example. The contacting section 33 includes a contacting surface 33S on the opposite side of the spacer 32. The contacting surface 33S is brought into contact with the wall surface 100S.

In addition, the upper attitude retaining mechanism 40 has an attachment section 41 provided on the rear surface of the housing 121 of the backlight unit 12, a spacer 42 provided to stand on the rear surface of the housing 121 at the attachment section 41, and a retainer 43 provided on the opposite side of the attachment section 41 with the spacer 42 interposed therebetween. A first end section 421 of the spacer 42 is fastened to the attachment section 41 by a screw 45, for example. A second end section 422 of the spacer 42 is fastened to the retainer 43 by a screw 46, for example. The retainer 43 has a groove 43G in the vicinity of the middle in the Z-axis direction thereof. The groove 43G engages with a cutout 44K (described later) formed on a suspension 442 of a base 44. The upper attitude retaining mechanism 40 further includes a base 44 fixed to the wall surface 100S. The base 44 includes a fixing section 441 that is brought into contact with the wall surface 100S and is fixed by a screw or the like, and the suspension 442 that is slightly spaced from the wall surface 100S to form a space between the suspension 442 and the wall surface 100S. The suspension 442 has the cutout 44K that extends, for example, in the vertical direction. Note that it is possible to set a shape and a size of the cutout 44K to any shape and any size to the extent in which the cutout 44K is able to come into engagement with the groove 43G of the retainer 43. For example, a plurality of the cutouts 44K may be provided along the X-axis direction. Further, instead of the cutout 44K, an opening may be formed that allows for retaining of the retainer 43.

[Inclination Adjusting Operation of Display Section 10 of Display Apparatus 1]

Referring now to FIGS. 5A, 5B, and 6, an inclination adjusting operation will be described. As illustrated in FIG. 5A, when the screw member 222R is raised with respect to the body 21, for example, by tightening the screw member 222R of the inclination adjusting mechanism 22R, the right end portion of the display unit 11 including the light guide member 14 is lifted via the contacting member 221, the bracket 17, and the like. Because the display unit 11 is integrated with the backlight unit 12 via the brackets 17 and 18 and the frame 19, the right end portion of the entire display section 10 is lifted consequently. A distance between the left end portion of the entire display section 10 and the body 21 is increased. Meanwhile, if the screw member 222L of the inclination adjusting mechanism 22L is not moved, the distance between the left end portion of the entire display section 10 and the body 21 does not change. Accordingly, the display section 10 is inclined slightly to the left with respect to the vertical direction.

Conversely, as illustrated in FIG. 5B, by tightening the screw member 222L of the inclination adjusting mechanism 22L without moving the screw member 222R of the inclination adjusting mechanism 22R, the display section 10 is inclined slightly to the right with respect to the vertical direction.

Accordingly, for example, in a case where the rightmost display section 10C is inclined slightly to the right with respect to other display sections 10A and 10B where three display sections 10A to 10C are arranged as illustrated in the upper part of FIG. 6, the display section 10C may be inclined slightly to the left by adjusting at least one of the screw member 222L or the screw member 222R of the display section 10C. As a result, as illustrated in the lower part of FIG. 6, a variation in the inclination of the three display sections 10A to 10C is reduced.

[Front-Rear Position Adjusting Mechanism of Display Section 10 of Display Apparatus 1]

The display apparatus 1 may further include a front-rear direction position adjusting mechanism 50 for adjusting positions of the display surfaces of the display sections 10 that are adjacent to each other. FIG. 7 is an enlarged cross-sectional diagram illustrating the vicinity of a boundary between the display section 10A and the display section 10B that are adjacent to each other, and illustrates a cross-section taken along the VII-VII cutting line illustrated in FIG. 1 and as viewed in an arrow direction. In FIG. 7, the display units 11 of the display section 10A and the display section 10B are denoted by reference numerals 11A and 11B, respectively, and the backlight units 12 of the display section 10A and the display section 10B are denoted by reference numerals 12A and 12B, respectively. Other components are denoted by their respective reference numerals in a similar manner as well.

The front-rear direction position adjusting mechanism 50 includes, for example, adhesion layers 51A and 51B, brackets 52A and 52B, and a fitting member 53. The bracket 52A is fixed via the adhesion layer 51A to, for example, an end surface 14AS of a light guide member 14A of the display unit 11A of the display section 10A. The bracket 52B is fixed via the adhesion layer 51B to, for example, an end surface 14BS of a light guide member 14B of the display unit 11B of the display section 10B. The fitting member 53 is a structure that includes a highly rigid material such as stainless steel, for example. The fitting member 53 has a T-shaped cross-section including projections 531 and 532 in the XZ plane, for example. Here, the projection 531 fits with a groove provided on the bracket 52A, and the projection 532 fits with a groove provided on the bracket 52B. In the front-rear direction position adjusting mechanism 50, relative positions of the bracket 52A and the bracket 52B in the Z-axis direction are kept constant via the fitting member 53. Accordingly, the bracket 52A is fixed in advance at a predetermined position of the end surface 14AS and the bracket 52B is fixed in advance at a predetermined position of the end surface 14BS so that the display surface LOAF of the display section 10A and the display surface 10BF of the display section 10B coincide with each other. Thus, when mounting the display apparatus 1 on the wall surface 100S, the projection 531 is fitted into the groove of the bracket 52A and the projection 532 is fitted into the groove of the bracket 52B, allowing the display surface LOAF and the display surface 10BF to coincide with each other naturally in the Z-axis direction.

Further, in the display apparatus 1, a joint member 54 may be fastened by screws or the like to each of the bracket 52A and the bracket 52B in such a manner as to bridge the bracket 52A and the bracket 52B as illustrated in (A) of FIG. 8. Thus, the relative positions of the display section 10A and the display section 10B that are adjacent to each other are more firmly maintained. Note that the fastening by the joint member 54 is performed after the inclination is adjusted as described with reference to FIGS. 5A, 5B, etc. (A) of FIG. 8A is an enlarged perspective diagram illustrating the vicinity of the boundary (a portion surrounded by a broken line VIII in FIG. 1) between the display section 10A and the display section 10B that are adjacent to each other. Further, (B) of FIG. 8 is a perspective diagram illustrating a cross-section of the display section 10 at an upper part of the display apparatus 1 in an enlarged manner. Except that a bezel 25 is provided instead of the bezel 24 and the joint member 54 is provided, other components are substantially the same as those of the structure of the display section 10 at the lower part of the display apparatus 1 (refer to FIG. 3). Note that (B) of FIG. 8 illustrates a cross-section taken along the VIIIB-VIIIB cutting line illustrated in (A) of FIG. 8 and as viewed in an arrow direction.

[Workings and Effects of Display Apparatus 1]

As described above, the display apparatus 1 according to the present embodiment includes the supporting structure 20 that is to be attached to the wall surface 100S and supports the display section 10. The supporting structure 20 has the body 21 as the support that supports the display section 10 from the below in the vertical direction, and the inclination adjusting mechanism 22 that is provided at the body 21 and adjusts the inclination of the display section 10 with respect to the vertical direction. Thus, according to the display apparatus 1, it is possible to adjust the inclination of the display section 10 with respect to the vertical direction by the inclination adjusting mechanism 22, in a state in which the load of the display section 10 is applied to the body 21. Hence, even when the display section 10 has a large screen, it is possible to relatively easily maintain, at a high level, an accuracy of a mounting position of the display apparatus 1 (or the respective display sections 10) and an accuracy of an attitude thereof upon mounting the display apparatus 1 on the wall surface 100S. That is, the display apparatus 1 according to the present embodiment has a structure excellent in workability upon installation thereof. Further, reliability of display quality of an image to be displayed on the entire screen of the display apparatus 1 formed by the plurality of display sections 10 further improves.

Further, according to the display apparatus 1 of the present embodiment, it is possible to reduce the mechanical load on the display section 10, as compared with a case where, for example, a supporting member fixed to the wall surface 100S is attached to the rear surface of the display section 10 and the load of the display section 10 is received by the supporting member. This is because, in the display apparatus 1, the display section 10 is placed on the supporting structure 20. Accordingly, it is possible to make the housing 121 of the backlight unit 12 thinner and lighter as compared with a case where, for example, the supporting is achieved by the rear surface of the display section 10 as described above. Further, it is considered that peeling of the adhesion layer AL1 between the display panel 13 and the light guide member 14 is less likely to occur as compared with a case where the supporting is achieved by the rear surface of the display section 10 as described above. In particular, in the display apparatus 1, the load of the light guide member 14 is received by the inclination adjusting mechanism 22 at a position directly below the relatively heavy light guide member 14 in the vertical direction. For this reason, the mechanical load to be applied on the adhesion layer AL1 that supports the relatively light display panel 13 by adhesion is reduced, making the peeling between the display panel 13 and the light guide member 14 extremely less likely to occur. For these reasons, according to the display apparatus 1 of the present embodiment, it is possible to improve long-term reliability.

In addition, in the display apparatus 1 according to the present embodiment, if the inclination adjusting mechanism 22 is provided in the vicinity of the both ends of the lower part of each of the display sections 10 in the horizontal direction, it is possible to more easily adjust the inclination of each of the display sections 10.

In addition, if the display apparatus 1 has one body 21 commonly and integrally provided for all the display sections 10A to 10C, mutual positional deviation of the display sections 10A to 10C in the vertical direction is less likely to occur. Further, workability upon attaching the display apparatus 1 having the plurality of display sections 10 to the wall surface 100S further improves.

In addition, in the display apparatus 1, the supporting mechanism 23 is provided between the inclination adjusting mechanism 22 and the wall surface 100S. Thus, the supporting mechanism 23 receives a part of the load of the display section 10, making it possible to stably support the display section 10 in cooperation with the inclination adjusting mechanism 22. Because the supporting mechanism 23 includes the biasing member 232, it is possible to elastically support the display section 10. Accordingly, upon installation of the display section 10, it is possible to prevent the display section 10 and the supporting structure 20 from being damaged due to the self-weight of the display section 10. Further, because a configuration is employed that allows the contacting member 231 to be also inclined in accordance with the inclination of the frame 19, the configuration is suitable for accurately maintaining the attitude after the adjustment of the inclination of the display section 10 by the inclination adjusting mechanism 22. Accordingly, the reliability of the display quality of the image to be displayed on the entire screen of the display apparatus 1 further improves.

In addition, because the display apparatus 1 further includes the lower attitude retaining mechanism 30 and the upper attitude retaining mechanism 40, it is possible to appropriately maintain the distance between the display section 10 and the wall surface 100S and the inclination angle (the elevation angle) of the display section 10 in the front-rear direction with respect to the vertical direction.

In addition, if the display apparatus 1 further includes the front-rear direction position adjusting mechanism 50 (FIG. 7), it is possible to relatively easily perform the adjustment of the positions in the front-rear direction of the display surfaces of the plurality of display sections 10 upon the installation of the display apparatus 1. Accordingly, the reliability of the display quality of the image to be displayed on the entire screen of the display apparatus 1 further improves.

In addition, if the display apparatus 1 further includes the joint member 54 that joins the brackets 52 of the front-rear direction position adjusting mechanism 50, it is possible to more firmly maintain the relative positions of the display section 10A and the display section 10B that are adjacent to each other. Accordingly, the reliability of the display quality of the image to be displayed on the entire screen of the display apparatus 1 improves even further.

2. Other Modification Examples

While the present disclosure has been described with reference to the above embodiments, the present disclosure is not limited to the above embodiments, and various modifications can be made. For example, in the display apparatus 1 described in the above embodiment, an example is illustrated in which the display apparatus 1 includes three display sections 10, but the number of display sections is not limited to three, and may be one or two or four or more. A shape of the screen of the display section is not limited to that illustrated in the drawings. In addition, although a liquid crystal display panel is exemplified as the display panel 13, for example, a self-luminous display panel such as an organic EL display panel may be adopted. In this case, no backlight unit is necessary.

In addition, in the present disclosure, the display apparatus may further include a front-rear direction adjusting member 26 that adjusts a distance between the wall surface 100S and the display section 10, as in a display apparatus 1A according to a first modification example illustrated in FIG. 9, for example. By providing the front-rear direction adjusting member 26, it is possible to easily adjust a position in the front-rear direction of the display section 10 upon installation work of the display section 10. The front-rear direction adjusting member 26 includes, for example, a shaft 261 rotatable about an axis J261 that extends in the vertical direction, screw members 262A and 262B, and link mechanisms 263A and 263B.

The shaft 261 has a lower threaded region at a lower part in a longitudinal direction (a direction along the axis J261) of an outer peripheral surface thereof, and an upper threaded region at an upper part in the longitudinal direction. The lower threaded region has a screw thread in the right-handed screw direction, and the upper threaded region has a screw thread in the left-handed screw direction.

The screw member 262A is a cylindrical member having, on an inner surface thereof, a screw groove screwed with the lower threaded region of the shaft 261, and the screw member 262B is a cylindrical member having, on an inner surface thereof, a screw groove screwed with the upper threaded region of the shaft 261. The screw members 262A and 262B are adapted to move toward or away from each other in the longitudinal direction of the shaft 261 by the rotation of the shaft 261 about the axis J261.

The link mechanism 263A includes a link section 264A and a link section 265A each having a base end that is coupled to the screw member 262A, and allows an angle θA between the link section 264A and the link section 265A to be changed in accordance with a position of the screw member 262A on the shaft 261. Similarly, the link mechanism 263B includes a link section 264B and a link section 265B each having a base end that is coupled to the screw member 262B, and allows an angle θB between the link section 264B and the link section 265B to be changed in accordance with a position of the screw member 262B on the shaft 261. Here, for example, the screw member 262A and the screw member 262B come close to each other in the longitudinal direction of the shaft 261, thereby enlarging the angle θA and the angle θB. Note that a pad section 266A that comes into contact with the wall surface 100S may be provided at an end of the link section 265A, and a pad section 266B that comes into contact with the wall surface 100S may be provided at an end of the link section 265B.

In the display apparatus 1A, it is possible to adjust the distance between the wall surface 100S and the display section 10 upon the installation work of the display section 10 by utilizing the front-rear direction adjusting member 26 described above. For example, first, as illustrated in (A) of FIG. 9, the display section 10 is placed on the supporting structure 20, and the front-rear direction adjusting member 26 is placed between the wall surface 100S and the display section 10. At this time, the display section 10 is placed at a position slightly closer to the wall surface 100S than an intended placement position. Next, as illustrated in (B) of FIG. 9, a handle HDL is attached to an end of the shaft 261, following which the handle HDL is rotated rightward, for example. By this operation, the screw member 262A and the screw member 262B come close to each other in the longitudinal direction of the shaft 261, enlarging each of the angles θA and θB at the link mechanisms 263A and 263B as illustrated in (C) of FIG. 9. As a result, the display section 10 moves to the front in such a manner as to be away from the wall surface 100S. Finally, as illustrated in (D) of FIG. 9, the rotation of the handle HDL is stopped at the time when the display section 10 has reached the intended placement position on the supporting structure 20, following which the handle HDL is removed and the bezel 25 is attached, thereby completing the adjustment of the position in the front-rear direction of the display section 10.

Further, in the present disclosure, the display apparatus may include a front-rear direction adjusting member 61 instead of the front-rear direction adjusting member 26, as in a display apparatus 1B according to a second modification example illustrated in FIG. 10, for example. The front-rear direction adjusting member 61 has a shaft 611 extending in the vertical direction, a handle 612, a worm gear 613, a worm gear wheel 614, a shaft 615 extending in the front-rear direction, and a receiving section 616 attached to the wall surface 100S. The handle 612 is provided at a base end of the shaft 611, and the worm gear 613 is provided at a distal end of the shaft 611. The worm gear wheel 614 is fixed to the shaft 615 and meshes with the worm gear 613. Accordingly, the shaft 615 moves in the front-rear direction as the shaft 611 rotates. In addition, a threaded region 615N having a screw thread is provided at the base end of the shaft 615 so that the screw thread of the threaded region 615N is threadedly engaged with a thread groove formed on an inner surface of the receiving section 616. The distal end of the shaft 615 is in contact with the rear surface of the display section 10. In the front-rear direction adjusting member 61 as well, it is possible to push out the display section 10 gradually to the front (+Z direction) by rotating the handle 612 in a predetermined direction. Accordingly, it is possible to adjust the position in the front-rear direction of the display section 10.

Further, the inclination adjusting mechanism of the present disclosure is not limited to the inclination adjusting mechanism 22 described in the above embodiment. Specifically, instead of the inclination adjusting mechanism 22 described in the above embodiment, the display apparatus may have an inclination adjusting mechanism 27, as in a display apparatus 1C according to a third modification example illustrated in FIG. 11A, for example. In the display apparatus 1C illustrated in FIG. 11A, a pair of inclination adjusting mechanisms 27 are provided at positions, in the supporting structure 20, that correspond to both end positions in the horizontal direction of one display section 10. Note that in FIG. 11A and later-described FIG. 11B, the inclination adjusting mechanism 27 on the left side of the drawing is denoted by a reference numeral 27L, and the inclination adjusting mechanism 27 on the right side of the drawing is denoted by a reference numeral 27R.

The inclination adjusting mechanism 27L is embedded in the body 21, and has a screw 271L, a first block 272L, and a second block 273L. The first block 272L includes an inclined surface 274L that is in contact with the second block 273L, and the second block 273L includes an inclined surface 275L that is in contact with the first block 272L. Rotating the screw 271L allows the first block 272L to be pushed in the +X direction, so that the second block 273L is lifted upwards in the vertical direction (+Y direction) in such a manner that the inclined surface 275L slides on the inclined surface 274L.

Similarly, the inclination adjusting mechanism 27R is embedded in the body 21, and has a screw 271R, a first block 272R, and a second block 273R. The first block 272R includes an inclined surface 274R that is in contact with the second block 273R, and the second block 273R includes an inclined surface 275R that is in contact with the first block 272R. Rotating the screw 271R allows the first block 272R to be pushed in the −X direction, so that the second block 273R is lifted upwards in the vertical direction (+Y direction) in such a manner that the inclined surface 275R slides on the inclined surface 274R. Thus, it is possible to lift the right side of the display section 10 and thereby to so adjust the display section 10 as to be inclined to the left side with respect to the vertical direction, by operating the inclination adjusting mechanism 27R without moving the inclination adjusting mechanism 27L as illustrated in FIG. 11B, for example. Conversely, by operating the inclination adjusting mechanism 27L without moving the inclination adjusting mechanism 27R, it is possible to lift the left side of the display section 10 and thereby to so adjust the display section 10 as to be inclined to the right side with respect to the vertical direction.

In addition, dimensions, dimensional ratios, and shapes of the respective components illustrated in each drawing are merely examples, and the present disclosure is not limited thereto. In addition, each component is not limited to a case where each component is configured by one component part, and may be configured by two or more component parts.

Further, for example, the display apparatus 1 described in the above embodiment and the like is not limited to a case where the display apparatus 1 includes all the described components, and may lack some of the components or may further include any other component.

For example, the display apparatus 1 described in the above embodiment and the like may further include a rear cover that covers the rear surface (a surface on the opposite side of the display panel 13) of a back chassis. The rear cover may include, for example, polystyrene (PS: polystyrene), a mixture material of polystyrene and polyphenylene ether (PPE: polyphenyleneether), or the like. The display apparatus 1 may further include any other decorative member. For example, a substrate including a drive circuit that drives a light emitting section of the backlight unit 12 or a tuner may be mounted on the rear cover.

In addition, in the above embodiment and the like, a so-called direct-type backlight unit has been exemplified, but the backlight unit of the present disclosure is not limited thereto. For example, it is also possible to use a so-called edge-type backlight unit in the present disclosure.

In addition, the display apparatus 1 described in the above embodiments and the like is not limited to a television used in a home, and includes broadly a display apparatus that displays data both indoors and outdoors. Furthermore, the display apparatus 1 described in the above embodiments and the like has applicability to a variety of medical devices (such as an endoscopic surgery system, an operating room system, or a microscopic surgery system).

As described above, the supporting structure and the display apparatus according to one embodiment of the present disclosure are excellent in workability upon the installation. It is to be noted that the effects described in the present specification are mere examples and description thereof is non-limiting. Other effects may be also provided. Moreover, the present technology can be configured as follows.

(1)
A supporting structure that is to be mounted on a wall surface and configured to support a display section, the supporting structure including:
a support configured to support the display section from below in a vertical direction; and
an inclination adjusting mechanism provided at the support and configured to adjust an inclination of the display section with respect to the vertical direction.

(2)
The supporting structure according to (1), in which the inclination adjusting mechanism includes a lifting member configured to push the display section up from the below.

(3)
The supporting structure according to (1) or (2), in which the inclination adjusting mechanism is provided in vicinity of each of both ends in a horizontal direction of the display section.

(4)
The supporting structure according to any one of (1) to (3), further including:
a contacting member configured to be in contact with a lower surface of the display section; and
a biasing member provided at the support and biases the contacting member upward in the vertical direction.

(5)
A display apparatus including:
a display section; and
a supporting structure that is to be mounted on a wall surface and supports the display section, in which
the supporting structure includes
a support that supports the display section from below in a vertical direction, and
an inclination adjusting mechanism provided at the support and configured to adjust an inclination of the display section with respect to the vertical direction.

(6)
The display apparatus according to (5), further including a front-rear direction adjusting member configured to adjust a distance between the wall surface and the display section.

(7)
The display apparatus according to (5) or (6), in which the inclination adjusting mechanism includes a lifting member configured to push the display section up from the below.

(8)
The display apparatus according to any one of (5) to (7), in which the inclination adjusting mechanism is provided in vicinity of each of both ends in a horizontal direction of the display section.

(9)
The display apparatus according to any one of (5) to (8), further including:
a contacting member that is in contact with a lower surface of the display section; and
a biasing member that is provided at the support and biases the contacting member upward in the vertical direction.

(10)
The display apparatus according to any one of (5) to (9), in which
the display section has a stack structure in which a light guide member, a liquid crystal display panel, and a backlight unit are stacked in order, and
the inclination adjusting mechanism includes a lifting member configured to push, out of the display section, the light guide member up from the below.

(11)
The display apparatus according to (10), further including:
a contacting member that is in contact with, out of the display section, a lower surface of the backlight unit; and
a biasing member that is provided at the support and biases the contacting member upward in the vertical direction.

(12)
The display apparatus according to any one of (5) to (11), further including:
a first display section and a second display section that are adjacent to each other and serve as the display section; and
a position adjusting mechanism configured to adjust a position of a display surface of the first display section and a position of a display surface of the second display section.

(13)
The display apparatus according to any one of (5) to (12), further including:
a base member configured to be attached to the wall surface and having a retaining part; and
a retaining member provided on a rear surface of the display section and retained by the retaining part of the base member.

The present application claims the benefit of Japanese Priority Patent Application JP2018-193567 filed with the Japan Patent Office on Oct. 12, 2018, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A supporting structure that is to be mounted on a wall surface and configured to support a display section, the supporting structure comprising:
    a support configured to support the display section from below in a vertical direction;
    an inclination adjusting mechanism provided at the support and configured to adjust an inclination of the display section with respect to the vertical direction;
    a contacting member configured to be in contact with a lower surface of the display section; and
    a biasing member provided at the support and biases the contacting member upward in the vertical direction.

2. The supporting structure according to claim 1, wherein the inclination adjusting mechanism includes a lifting member configured to push the display section up from the below.

3. The supporting structure according to claim 1, wherein the inclination adjusting mechanism is provided in vicinity of each of both ends in a horizontal direction of the display section.

4. A display apparatus comprising:
    a display section; and
    a supporting structure that is to be mounted on a wall surface and supports the display section, wherein
    the supporting structure includes
        a support that supports the display section from below in a vertical direction,
        an inclination adjusting mechanism provided at the support and configured to adjust an inclination of the display section with respect to the vertical direction,
        a contacting member that is in contact with a lower surface of the display section, and
        a biasing member that is provided at the support and biases the contacting member upward in the vertical direction.

5. The display apparatus according to claim 4, further comprising a front-rear direction adjusting member configured to adjust a distance between the wall surface and the display section.

6. The display apparatus according to claim 4, wherein the inclination adjusting mechanism includes a lifting member configured to push the display section up from the below.

7. The display apparatus according to claim 4, wherein the inclination adjusting mechanism is provided in vicinity of each of both ends in a horizontal direction of the display section.

8. A display apparatus comprising:
    a display section; and
    a supporting structure that is to be mounted on a wall surface and supports the display section, wherein
    the supporting structure includes
        a support that supports the display section from below in a vertical direction, and
        an inclination adjusting mechanism provided at the support and configured to adjust an inclination of the display section with respect to the vertical direction, wherein
    the display section has a stack structure in which a light guide member, a liquid crystal display panel, and a backlight unit are stacked in order, and
    the inclination adjusting mechanism includes a lifting member configured to push, out of the display section, the light guide member up from the below.

9. The display apparatus according to claim 7, further comprising:
    a contacting member that is in contact with, out of the display section, a lower surface of the backlight unit; and
    a biasing member that is provided at the support and biases the contacting member upward in the vertical direction.

10. The display apparatus according to claim 8, further comprising:
    a base member configured to be attached to the wall surface and having a retaining part; and
    a retaining member provided on a rear surface of the display section and retained by the retaining part of the base member.

11. A display apparatus comprising:
    a display section;
    a supporting structure that is to be mounted on a wall surface and supports the display section, wherein
    the supporting structure includes
        a support that supports the display section from below in a vertical direction, and
        an inclination adjusting mechanism provided at the support and configured to adjust an inclination of the display section with respect to the vertical direction;
    a first display section and a second display section that are adjacent to each other and serve as the display section; and
    a position adjusting mechanism configured to adjust a position of a display surface of the first display section and a position of a display surface of the second display section.

* * * * *